Sept. 9, 1969  D. A. DALY  3,465,625
HIGH SPEED TRIM SYSTEM
Filed May 8, 1967  2 Sheets-Sheet 1
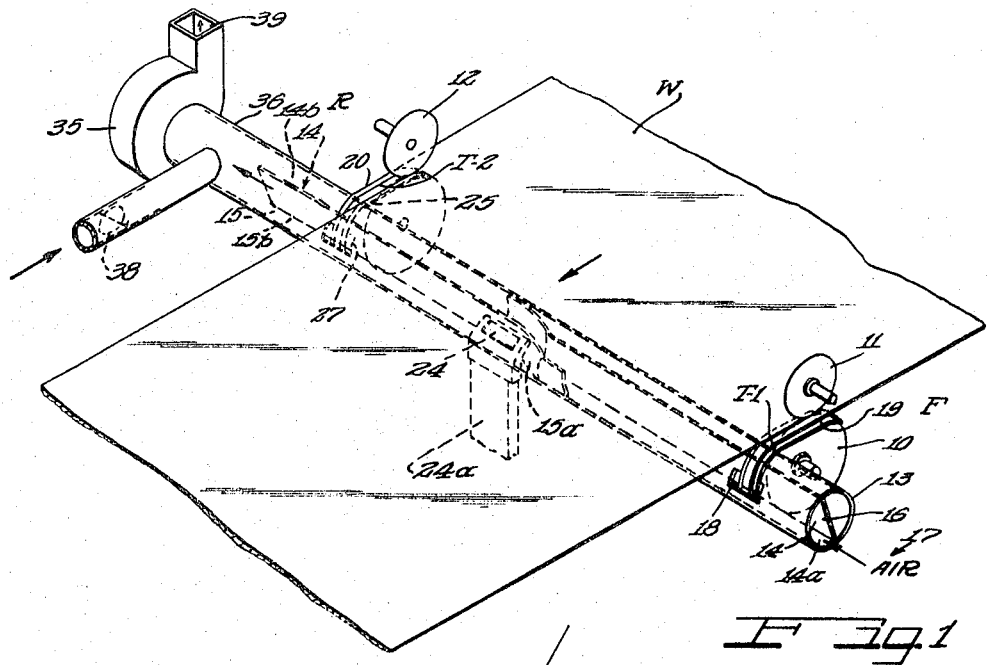
Fig. 1
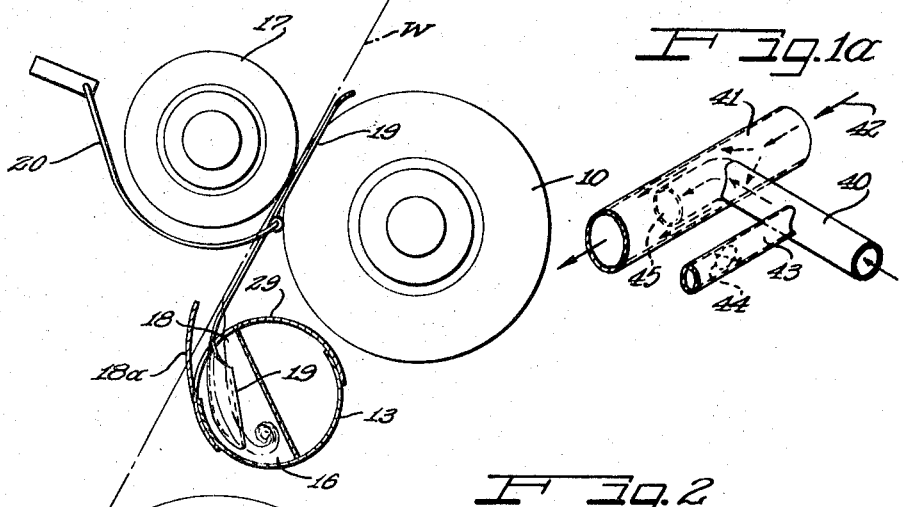
Fig. 1a
Fig. 2
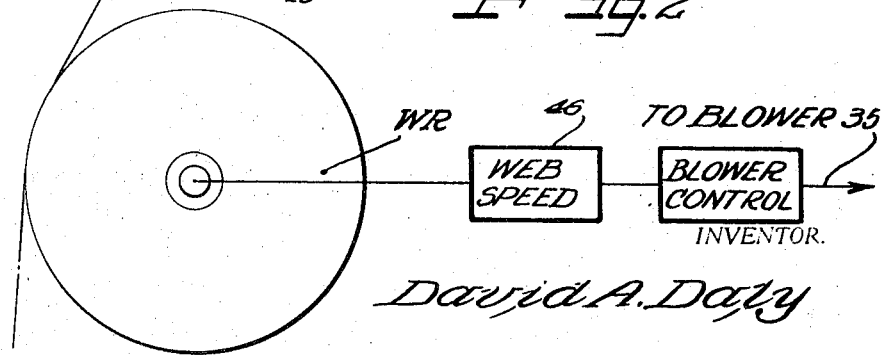
INVENTOR.
David A. Daly
BY *Hill, Sherman, Meroni, Gross & Simpson*
ATTORNEYS

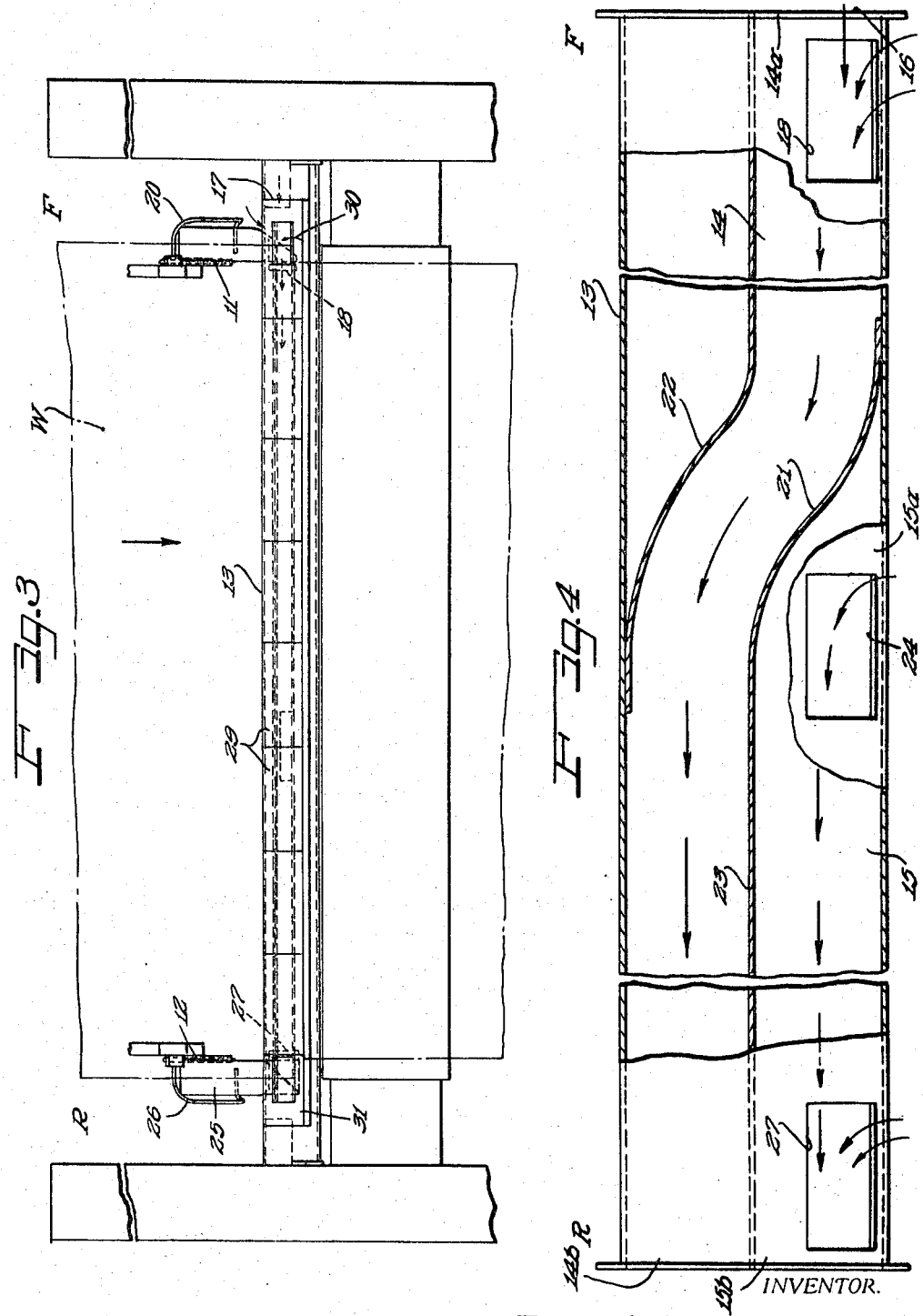

United States Patent Office 3,465,625
Patented Sept. 9, 1969

3,465,625
HIGH SPEED TRIM SYSTEM
David A. Daly, Exton, Pa., assignor to Beloit Eastern Corporation, Downingtown, Pa., a corporation of Delaware
Filed May 8, 1967, Ser. No. 636,925
Int. Cl. B26d 1/24; B65h 17/32
U.S. Cl. 83—100                                              15 Claims

ABSTRACT OF THE DISCLOSURE

The disclosure incorporates a slitting machine wherein strips are trimmed from each side of a travelling web and delivered downwardly into a conduit means at high speed and carried laterally beneath the machine to a discharge chute.

BACKGROUND OF THE INVENTION

The invention relates to improvements in trimmers of the type used for trimming edge strips from a travelling paper web with means for carrying the trimmed strips away at high speed.

The art of trimming strips from the edge of a travelling web in order to obtain a web of a predetermined width and with a finished edge has progressed to where the strips can be removed at a relatively high speed. In paper-web trimming and slitting for example, speeds of 6,000 feet per minute are achieved. However considerable difficulty has been encountered in getting rid of the trimmed strip at these high speeds and any congestion or backup of the trim strips adversely effects the trimming operation and if chutes or ducts for carrying the strips away jam, it requires curtailing production until these chutes can be cleared. Often when the trim strip removal chute or duct jams a substantial amount of paper is wasted or damaged in order to slow down or stop the machine until the jam-up of trim strip material can be cleared.

It is thus an object of the present invention to provide a system for removal of the strips trimmed from the edge of a high speed travelling web in an efficient and uniform manner at a speed which equals the production speed capabilities of present high speed trim machines.

A further object of the invention is to provide a trim strip removal conduit arrangement wherein the strips are taken across the machine from the front to the back side and kept separate until delivery into a disposal chute. This is particularly useful in a machine where the configuration is such that it is impossible to carry the trim essentially in its line of travel due to machine components being in the way.

A still further object of the invention is to provide a trim strip removal system which utilizes air flow to entrain the strips and establishes a relationship between the airflow and conduit means with the strip inlets so that the possibility of the strip becoming caught or jamming is substantially eliminated.

SUMMARY OF THE INVENTION

The invention embodies a web handling machine including support means carrying a web travelling at a predetermined speed, slitter blades at the front and rear of the machine slitting edge strips off the sides of the web, a trim strip removal conduit means extending from the front edge to the rear edge of the machine, a first passage in the conduit means having an inlet end at the front of the machine and a discharge end at the rear of the machine, means for supplying high velocity air to an air inlet at the inlet end of the first passage, means for depositing one edge strip into the first passage through a strip opening downstream from the air inlet, a second passage in the conduit means having an inlet end between the front and rear of the machine and having a discharge end at the end of the machine, means for delivering the other strip to an inlet in the second passage downstream of the inlet end, and means for supplying high velocity air to the second passage at the inlet end upstream of the strip inlet.

BRIEF DESCRIPTION OF THE DRAWINGS

FIGURE 1 is a perspective view shown somewhat diagrammatic in form of a mechanism constructed and operating in accordance with the principles of the present invention;

FIGURE 1a is a diagrammatic view of another form of a portion of the mechanism of FIGURE 1;

FIGURE 2 is an end view of the mechanism of FIGURE 1;

FIGURE 3 is a top plan view of the mechanism; and

FIGURE 4 is a sectional view with parts removed of the conduit means for handling of the trim strips.

DESCRIPTION OF THE PREFERRED EMBODIMENT

FIGURES 1 and 3 show a web W travelling at a predetermined speed. At the side edges of the web are slitter blades 11 and 12 for cutting trim strips T–1 and T–2 off of a web W. The trim strips are smoothly and effectively carried downwardly and then laterally from the front to the rear of the machine. Using the terminology of the art, the machine has a front side F and a rear side R usually designated in accordance with the position of the machine in a shop.

As the trim strips T–1 and T–2 are cut from the edges of the web they are carried downwardly to a conduit means 13 below the web, which extends across the machine to a discharge means such as a chute, not shown. The trimmed web is carried on a roll WR to a subsequent process.

The conduit means is divided into a first passage 14 at a second passage 15.

The first passage 14 has an inlet end 14a at the front side of the machine and a discharge end 14b at the rear side of the machine. The second passage 15 has an inlet end 15a midway between the front and rear of the machine, and a discharge end 15b at the rear of the machine.

At the inlet end 14a of the first passage is an air inlet opening admitting a flow 16 of high velocity air from an air inlet source 17 into the passage 14. Air is caused to flow by suction at discharge end of duct 14. Either of the means shown on FIGURES 1 or 1a is a satisfactory. The air velocity attained and not the means used is important.

FIGURE 1 shows a blower 35 having a suction 36 connected to the conduit means 13. The trim strips are delivered through the blower outlet 39 and air flow velocity is controlled by blower speed or by positioning a damper 38 in a side inlet 37 into the conduit means 38. In another arrangement as shown in FIGURE 1a, air is moved through a conduit 41 by a blower, not shown, and air flow through the conduit 13 (of FIGURE 1) is induced by connecting to tube 40 which has an open end 45 facing downstream and centered in conduit 46. This arrangement induces a flow of air in tube 40, and flow velocity can be controlled by a damper 44 in a side inlet 43.

The velocity of the air may be controlled as a function of web speed by a speed measurement device 46, FIGURE 2, supplying a signal to a blower control 47, connected to the blower or to the damper.

Downstream from the air inlet 16 is a trim strip inlet 18. A guide 18a may be positioned behind the opening 18 to catch the trim if it overshoots the opening.

The trim strip inlet opens radially into the side of the passage 14 and a shaped curved strip guide 19 directs the first trim strip T–1 into the strip inlet 18. The guide 19 is shaped to receive the trim strip T–1 on its upper surface as soon as the strip is removed from the web and curves downwardly into the opening 18 and then is twisted to face axially downstream along the passage 14. The trim strip thus follows the smooth under surface of the guide 19 being pulled therealong by the strip that extends down through the passage 14. The strip in the passage is carried by the high velocity air provided by the air flow 17. The trim strip then continues down the first passage 14 and the passage jogs or deviates at the midpoint of the machine by baffles 21 and 22 which lead the passage 14 from one side of the conduit 13 to the other side to accommodate the position of the second passage 15. With this arrangement the first passage is of substantially uniform cross sectional size throughout its length to maintain a uniform air velocity travel. The second passage may have an air inlet opening 24 to admit air to the passage 15 for cross flow air, FIGURE 1.

A web shield 24a keeps the web from being pulled down by air flow.

The trim strip T–2 from the rear side of the machine threads downwardly into the second passage 15 through a strip inlet opening 27 which is downstream from the air inlet opening 24. A shaped smooth guide 25 receives the strip T–2 as soon as it is cut by the trim blade 12. The strip follows above the guide 25 which is bent smoothly downwardly and then twisted to face in the axial direction of air flow along the second passage 15. The strip is pulled along the surface by the strip material which has preceded it into the opening 27 and on which a continuous tension is placed by the traveling air stream, as indicated by the arrowed lines in FIGURE 4.

Some air must flow into the opening 27 with the trim and it has been discovered that an opening having an area at least equal to the cross sectional area of the cross duct 14 or 15 is preferred for effective balancing of the flow "in the trim hole" with the "cross flow." Also it has been discovered that the air velocity at the discharge end, i.e., at blower inlet 36, has a critical range relative to the speed of travel of the web. Air velocity having a minimum of three times the speed of web travel is preferred for effective operation. The air velocity should increase and decrease with the web speed. Velocity at 14 and 15 can be controlled by a damper or variable speed blower (see FIGURES 1 and 1a). High air velocities will cause the trim to "stick" to the guide 19 when trim is moving at low speeds. The cross sectional size of the trim chute is also related to the trim width. When a chute of a predetermined size has been selected, it has been found that a trim width no greater than the trim chute width times .65 should be utilized. This is with the employment of a circular or other regular cross section conduit means as illustrated in the drawings.

The conduit 13 is formed of sheet metal or other suitable material. The conduit 13 has a substantially continuous lower portion with the upper portion formed in sections such as shown at 29 in FIGURE 3 with each section forming a portion of the cover for the conduit 13. These cover portions are removably fastened in place by suitable securing means, not shown, so that they can be interchanged. The cover sections 29 have two units 30 and 31 which are provided with the trim strip openings 18 and 27. When webs have different widths are used, different cover plates or sections are removed and the cover sections 30 and 31 with the openings are placed in the proper location for receiving the trim strip at the location where it is removed from the web. In other words when a narrower web is used, the cover plates 30 and 31 will be moved inwardly and other imperforate plates will be positioned in the location which they occupy in FIGURE 3. Thus the trim strip can be delivered directly downwardly to the conduit means 13 for being received by the passage in the shortest path with a minimum of distortion.

The first passage 14 is separated from the second passage 15 by a diametral plate or baffle 23 which extends across the circular conduit 13, FIGURE 4. With this arrangement a unit conduit 13 is employed and the conduit is positioned so that the trim strip receiving openings 18 and 27 are at an optimum location relative to their downward travel. It will be noted that both openings 18 and 27 are at the same location in the direction of web travel and do not have to be positioned in advance or behind one another. Also, the direction of airflow in individual passage is directly upstream of the strip inlet openings and a single air inlet accommodates change in locations of the strip inlet openings as they are changed when webs of different widths are trimmed. Also while the cover plates 29 function essentially to permit simple and rapid change of the location of the trim strip openings, they also permit access to the full interior of the conduit 13 and to both of the passages since the separator baffle between the passages is located so that it bisects the cover plate.

In operation a web W travels along at a predetermined speed carried on a supporting roll ahead of slitter band 10, FIGURE 2 and strips T–1 and T–2 are cut from the side, FIGURE 1. The strips are guided down into passages 14 and 15 within a conduit means 13 by guides 19 and 25 and high velocity air streams admitted at the front of the machine for the first passage 14, and at a location midpoint of the front and rear for the second passage 15 pick up the strips and maintain a tension on them which extends up along the guides to the location where the knives 11 and 12 engage the strip. This also aids in performing a smooth cutting operation for the trim strips inasmuch as a tension is maintained on the strip in the machine direction at the point where the slit occurs.

The drawings and specification present a detailed disclosure of the preferred embodiments of the invention, and it is to be understood that the invention is not limited to the specific forms disclosed, but covers all modifications, changes and alternative constructions and methods falling within the scope of the principles taught by the invention.

I claim as my invention:

1. In a web handling machine with means for removing trim strips from both sides of the web, the combination comprising, a trim removal conduit means extending from the front side to the rear side of the machine, a first passage in the conduit means having an inlet end at the front of the machine and a discharge end at the rear of the machine, means for generating a flow of air through the passage from an air inlet at the inlet end, means guiding a first trim strip cut from one side of the web into a web inlet at the inlet end of the first passage downstream of the air inlet, a second passage in said conduit means having an inlet end between the front and rear of the machine and having a discharge end at the rear of the machine, means for generating a flow of air through the second passage from an air inlet at the inlet end of the second passage, and means guiding a second trim strip cut from the other side of the web into a strip inlet in the second passage downstream of the air inlet and upstream of the discharge end.

2. In a web handling machine with means for removing trim strips from both sides of the web constructed in accordance with claim 1 wherein said first passage has a first portion at the front of the machine and has a second portion rearward of said first portion each of which forms only substantially one half of the conduit means.

3. In a web handling machine with means for removing trim strips from both sides of the web in accordance with claim 2 wherein a smooth baffle deflects the strip from the first to the second portion of the first passage and extends across the conduit means.

4. In a web handling machine with means for removing trim strips from both sides of the web in accordance with claim 1, the combination including a smooth first strip guide extending from a side of the web into the strip inlet in the first passage and includes a second strip guide extending from the other side of the web into the strip inlet for the second passage.

5. In a web handling machine with means for removing trim strips from both sides of the web in accordance with claim 1 wherein said conduit means has a plurality of removable imperforate plates along its length with individual plates removable to form said strip receiving openings for said first and second passage.

6. A web handling machine comprising support means carrying a web travelling at a predetermined speed,
   slitter blades at the front and rear sides of the machine slitting edge strips off the sides of the web,
   a trim removal conduit means extending beneath the machine from the front side to the rear side of the machine,
   a first passage in the conduit means having an inlet end at the front of the machine and a discharge end at the rear of the machine,
   means for generating a flow of air through the passage from an air inlet at the inlet end,
   means for depositing the edge strip from the slitter blade at the front of the machine into a strip opening in said first passage at the inlet end downstream from the air inlet,
   a second passage in said conduit means having inlet end between the front and rear of the machine and having a discharge end at the rear of the machine,
   means for generating a flow of air through the second passage from an air inlet at the inlet end, and
   means for delivering the edge strip from the slitter blade at the rear of the machine to a strip opening in the second passage downstream of the air inlet.

7. A web handling machine in accordance with claim 6 wherein said air supply means for said first and second passages each deliver air at a velocity no less than three times said predetermined speed of web travel.

8. A web handling machine in accordance with claim 6 wherein the strip openings into the passages have an area at least equal to the passage area.

9. A web handling machine in accordance with claim 6 wherein said conduit means is cylindrical and said first and second passages are separated at the rear end of the machine by a diametral plate extending across the conduit.

10. In a web handling machine with means for removing trim strips from both sides of the web constructed in accordance with claim 1 wherein the combination includes means for selectively locating the strip inlets in the first and second passages along the length of the passages downstream of the air inlets.

11. In a web handling machine with means for removing trim strips from both sides of the web constructed in accordance with claim 1 wherein said air flow generating means includes a blower having an intake connected to the discharge ends of said passages.

12. A web handling machine in accordance with claim 6 wherein said air flow generating means includes a blower having an intake connected to the discharge ends of said passages.

13. In a web handling machine with means for removing trim strips from both sides of the web constructed in accordance with claim 1 wherein said air flow generating means includes a blower having an intake connected to the discharge ends of said passages and means is provided for controllably bleeding air into the blower inlet for controlling air flow.

14. In a web handling machine with means for removing trim strips from both sides of the web constructed in accordance with claim 1 wherein the combination includes means for controlling the velocity of air flow as a function of speed of web travel.

15. In a web handling machine with means for continuously removing trim strips from both sides of the web, the combination comprising,
   a trim removal conduit means extending from the front side to the rear side of the machine,
   a first passage in the conduit means having a discharge end at the rear of the machine,
   a second, separate passage in said conduit means having a discharge at the rear of the machine,
   means defining a trim strip inlet into the first passage for receiving a trim strip removed from one side of a web,
   means defining a trim strip inlet into the second passage for receiving a trim strip removed from an opposite side of the web,
   means for generating a flow of air through the first passage from the strip inlet to the discharge, and
   means for generating a separate flow of air through the second passage from the trim strip inlet to the discharge.

References Cited
UNITED STATES PATENTS

| | | | |
|---|---|---|---|
| 341,895 | 5/1886 | Edmunds | 83—100 |
| 942,209 | 12/1909 | Metcalfe | 83—100 X |
| 1,854,481 | 4/1932 | Mudd | 83—100 X |
| 3,156,149 | 11/1964 | Frizelle | 83—100 X |
| 3,194,095 | 7/1965 | Buck et al. | 83—100 |
| 3,272,651 | 9/1966 | Quirk | 83—100 X |
| 3,345,894 | 10/1967 | Carlson et al. | 83—100 |

FRANK T. YOST, Primary Examiner

U.S. Cl. X.R.
83—105; 226—97